US005472239A

United States Patent [19]
Trujillo

[11] Patent Number: 5,472,239
[45] Date of Patent: Dec. 5, 1995

[54] LAMINATED MAP DIRECTORY

[76] Inventor: Larry D. Trujillo, 4560 King St., Denver, Colo. 80211

[21] Appl. No.: 241,778

[22] Filed: May 12, 1994

[51] Int. Cl.⁶ .................................................. G09B 29/00
[52] U.S. Cl. ............................... 283/34; 283/61; 281/39; 40/904
[58] Field of Search ...................... 283/33, 34, 35, 283/42, 48.1, 52.1, 61, 115; 281/2, 3.1, 27.1, 38, 39, 42, 45; 402/79; 40/904

[56] References Cited

U.S. PATENT DOCUMENTS

| | | | |
|---|---|---|---|
| 648,913 | 5/1900 | Bentley | 283/34 |
| 1,537,634 | 5/1925 | Watson | 283/34 |
| 4,673,197 | 6/1987 | Shtipelman et al. | 283/34 |

FOREIGN PATENT DOCUMENTS

| | | | |
|---|---|---|---|
| 136351 | 1/1934 | Austria | 283/35 |
| 1339694 | 12/1973 | United Kingdom | 283/35 |

*Primary Examiner*—David P. Bryant
*Attorney, Agent, or Firm*—John L. Isaac

[57] ABSTRACT

A laminated map panel is disclosed for use in a map booklet. The panel includes a substantially flat, relatively stiff panel member including first and second faces located on opposite sides of the plane of the panel. The panel also includes first and second substantially parallel side edges that are generally equal in length, and first and second substantially parallel end edges of generally equal length. The panel also includes a map display sheet disposed on at least the first face which is aligned to provide a blank margin member disposed between the display sheet and the first side edge. This provides an erasable writing area. In addition, a mechanism is provided proximate the second side edge for removably securing the panel to the booklet. Finally, laminate members cover the first and second faces.

16 Claims, 1 Drawing Sheet

LAMINATED MAP DIRECTORY

BACKGROUND OF THE INVENTION

1. Field of the Invention

The present invention relates, generally, to map directories and, more particularly, to map directories in book form having a plurality of pages each displaying a detailed map portion of an area. Specifically, the present invention relates to an improved map booklet construction having a key map for a given area with the pages of the booklet then representing detailed map portions in sequenced fashion for certain portions of the area of the key map.

2. Description of the Prior Art

Maps come in a variety of constructions and arrangements ranging from single large maps which are folded in accordion fashion into a relatively concise configuration, to map directories or booklets having a plurality of bound pages or leaves, each of which represents a detailed map of a larger key map or section area. Detailed city map directories are commonly formed in booklet fashion wherein a key map represents an enlarged area including a city and surrounding towns. The key map is then sectioned off into generally equal rectangular-shaped sections and numbered. The subsequent pages in the directory correspond to the various numbered pages on the key map, each page showing that particular portion of the city area in considerably greater detail. Frequently, such city maps display extreme details in each individual page portion.

Such city directories or booklets are commonly used by people new to the town, realtors, salesmen and the like. Such maps enable a person to easily navigate around a city or town having numerous city street names and subdivisions due to the detailed nature of the individual page portions of the directory. Of course, the directory is crossed-referenced by street name and as to location within the key map. Such directories enable a person to navigate their way to just about any area of a city given the detailed nature of such maps.

While such map directories or booklets are common to the art, there are certain drawbacks to map constructions and arrangements presently available. These map directories tend to be constructed from paper and thus are easily soiled and can absorb liquid present in an automobile environment, such as coffee, soda pop and the like. While lamination such as disclosed in U.S. Pat. No. 5,207,457 can prevent such soiling, there is a further problem that users of such map directories frequently require written directions in order to find a location in a directory. For example, realtors frequently use such directories to find home locations throughout an entire city area. Such written directions must generally be written on a separate piece of paper which can be readily lost. Moreover, even if the paper is not lost, there is a requirement to constantly focus between the written directions and the map, requiring the realtor to pull over while driving a vehicle in order to use such directories. Thus, while the map directories known to the art are very functional in terms of providing detailed information of an area, the use of such map directories is still somewhat cumbersome. Consequently, it would be highly desirable to have such a directory which does not soil, and which may allow the user to couple use of the map directory with written instructions in a reusable fashion.

SUMMARY OF THE INVENTION

Accordingly, it is one object of the present invention to provide an improved map directory construction.

It is another object of the present invention to provide a map in book-form wherein the pages thereof are removable for easy replacement and updating as well as being soil resistant.

Yet another object of the present invention is to provide an improved map directory wherein a defined space is provided for written directions adjacent to the map and constructed in reusable fashion.

To achieve the foregoing and other object and advantages, and in accordance with the purposes of the present invention as embodied and broadly described herein, a laminated map panel for use in a map booklet is disclosed. Each panel is in the form of a substantially flat, relatively stiff panel and includes first and second faces located on opposite sides of the plane of the panel. The panel includes first and second substantially parallel side edges of generally equal length and first and second substantially parallel end edges also of generally equal length. The panel further includes a map display sheet disposed on at least the first face which is aligned to provide a blank margin strip member disposed between the display sheet and the first side edge. This provides an erasable writing area. A mechanism is also disposed proximate the second side edge for removably securing the panel to the booklet. Finally, laminate members cover both the first and second faces.

BRIEF DESCRIPTION OF THE DRAWINGS

The accompanying drawings which are incorporated in and form a part of the specification, illustrate preferred embodiments of the present invention and, together with a description, serve to explain the principles of the invention. In the drawings.

DETAILED DESCRIPTION OF THE PREFERRED EMBODIMENTS

Figure 1:
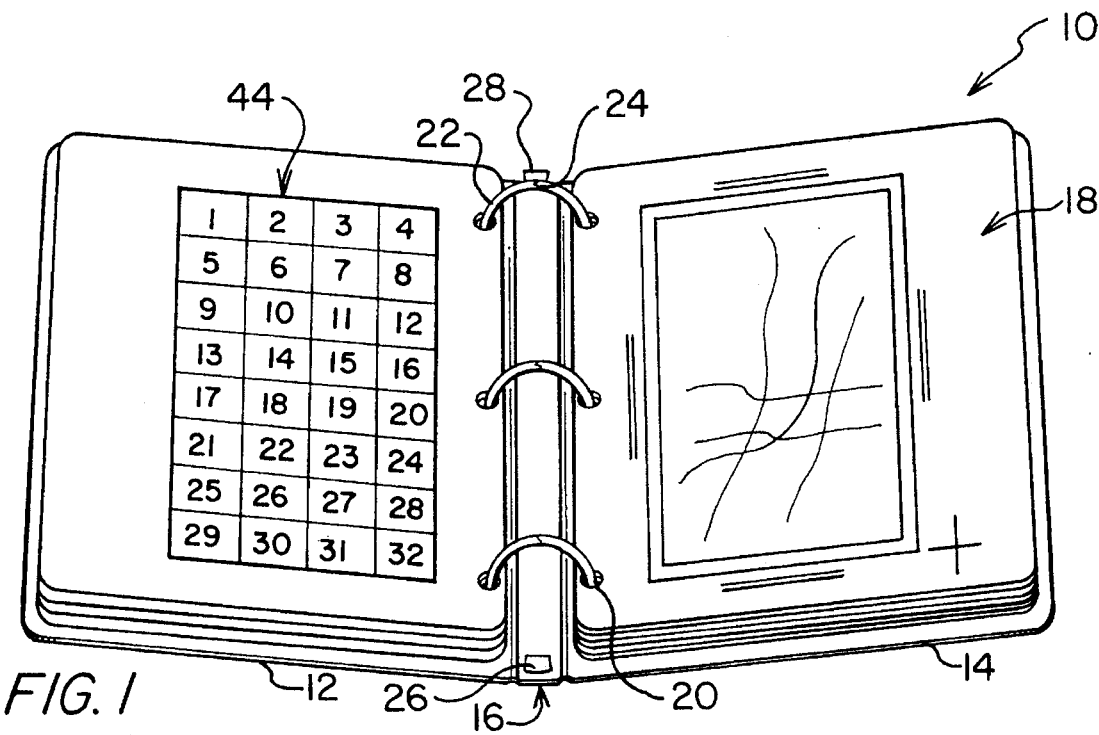
FIG. 1 is a front perspective view of a map directory constructed in accordance with the present invention.
Figure 2:
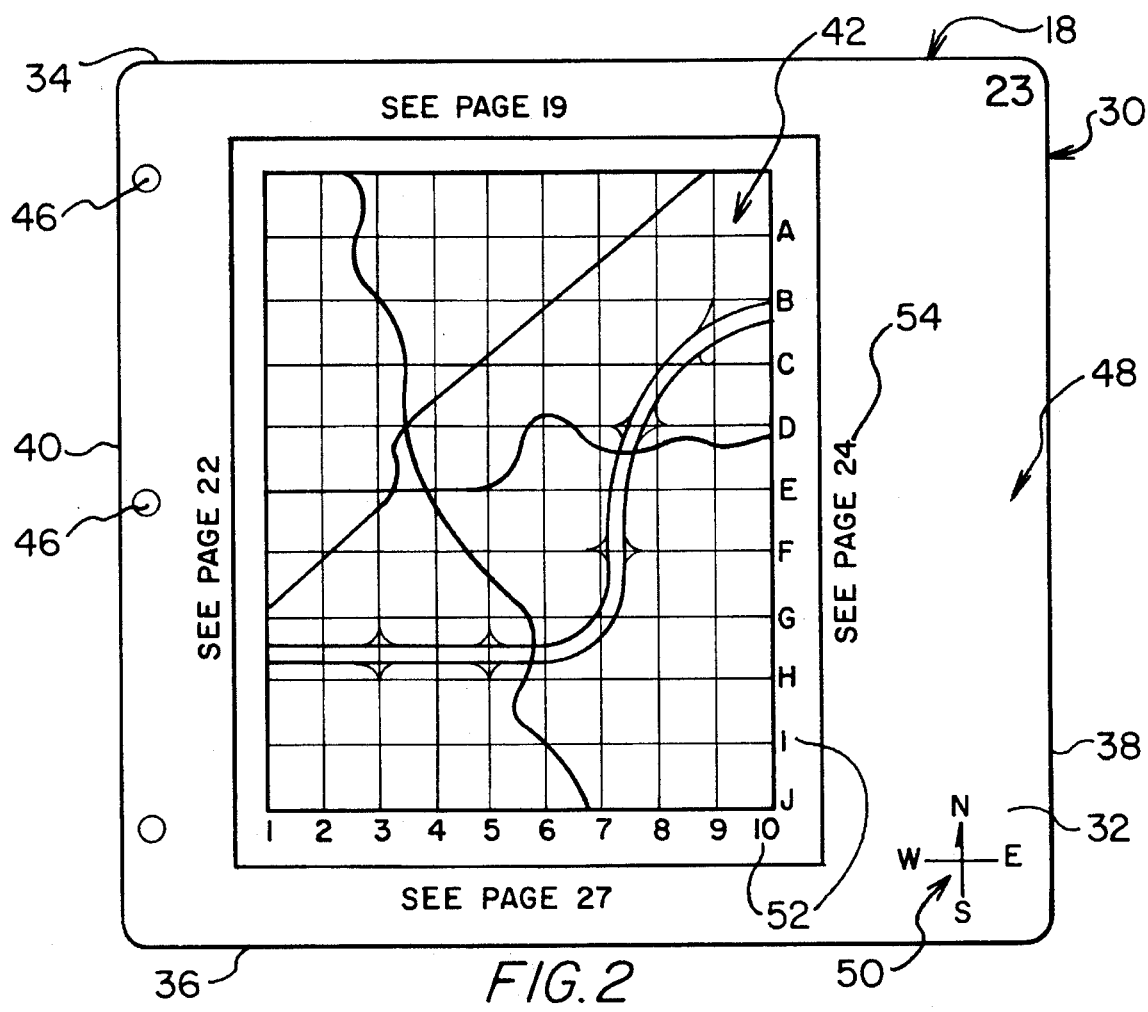
FIG. 2 is an enlarged front plan view of one panel or page of the directory illustrated in FIG. 1 and constructed in accordance with the present invention.

Referring to FIGS. 1 and 2, a map directory or booklet 10 includes a front cover 12 and a rear cover 14 interconnected to each other by binder member 16. The covers 12, 14 and binder member 16 may be on integral piece or may be separate and interconnected to each other. The cover members 12, 14 may be constructed from any desired material known in in the art and is preferably a relatively stiff material such as cardboard, vinyl covered cardboard, plastic and the like.

Positioned between the covers 12, 14 are a plurality of pages 18, each of which contains a map portion as described below. While the individual pages 18 may be permanently mounted to the binder 16, it is preferred that they be removable and detachable therefrom. This arrangement enables corrections and upgrades to be made to an individual map portion or grid without having to change and discard the entire directory 10.

To accomplish the above function, it is preferred that the binder 16 includes an attachment mechanism 20 in the form of a plurality of ring members 22 of standard and well known design. Each ring member 22 may be separated at a juncture portion 24, and the opening and closing thereof may be controlled by toggle members 26, 28 positioned at each end of the binder 16. In accordance with this well known construction, the rings 22 may be separated at their juncture 24 so as to remove any number of individual pages 18 and then rejoined to form the closed directory 10. This ring binder arrangement described above is a well known construction, and further discussion thereof is not deemed necessary.

Each individual page member 18 is in the form of a panel 30. Each panel 30 has a front face 32 and a back face (not illustrated) which is identical in format to the front page 32. For purposes of discussion, the front face 32 of panel 30 will be described, although it is applicable to either front or rear faces of any of the page members 18. Each panel 30 includes upper and lower end edges 34, 36 which are preferably substantially parallel and equal in length, a first side edge 38, and a second side edge 40, the side edges 38, 40 also preferably being substantially parallel and generally equal in length. The end edges 34, 36 are preferably approximately 5–11 inches in length, while the side edges 38, 40 are preferably 8–13 inches in length. In most preferred form, the end edges 34, 36 are approximately 8.5 inches in length, while the side edges 38, 40 are approximately 11 inches in length. The dimensions of the end edges 34, 36 and the side edges 38, 40 are determined generally by the practicality of ease of use, in that a directory of sufficient size is desirable. An overly large directory is cumbersome, while an undersized directory is very difficult to provide sufficient detail for practical map purposes.

Each panel 30 includes a map portion 42 positioned on the front face 32 which provides details of an area that is outlined by a key map 44 of the directory 10. Means for securing the panel 18 to the binder 16 are positioned along the second side edge 40 and preferably include a plurality of apertures 46 which are sized and positioned to receive the ring members 22 of the attachment mechanism 20. If the attachment mechanism 20 is of a different construction, then apertures 46 will be sized and positioned differently. For example, should the attachment mechanism 20 be a spiral wire of a permanent binder, then the apertures 46 will be much more numerous than illustrated to accommodate such a spiral connector.

The portion of the panel 18 disposed between the map portion 42 and the first side edge 38 is preferably a blank margin member 48 which is significantly larger than the margin between the second edge 40 and the map portion 42. The blank margin area 48 extends the entire length of the panel 30 between the end edges 34, 36 and has a width dimension sized to create a ratio of the width of the margin member 48 to the panel 30 of approximately 0.15–0.25. In preferred form, the width of the elongated margin member 38 is approximately 1–2 inches and in most preferred form approximately 1.5–2 inches. In preferred form, a polar direction guide 50 is positioned along the margin member 48, preferably at the bottom position, in order to provide a directional reference to the map portion 42. Also in preferred form, marking indicia 52 are provided along the side and end edges of the map portion 42 in order to give cross-reference information to the map portion 42. Moreover, a cross-referenced index 54 is provided relative to the other map display sheets positioned on the other pages 18 of the directory 10.

In preferred form, each panel 30 is covered on both its front and rear faces by a laminate sheet in order to preferably form an entirely laminated panel 30. The laminations of both front and rear faces of the panel 30 provide stiffness to each panel 30 as well as provide an erasable surface. This erasable surface is particularly important relative to the blank margin portion 48. The erasable surface is designed to be particularly useful with dry erase ink so that markings may be made on the surfaces of the panel 30 and then removed for reuse of the margin portion 48.

Typically, when map directories of the type illustrated in FIGS. 1 and 2 are utilized by, for example realtors or salesmen, such directories provide detailed information such as the location of housing developments, street and building locations and the like. Thus, the information provided by each map display sheet 42 is quite generally detailed. Nonetheless, when one utilizes such a map directory 10, one may often have written instructions or directions relative to a specific location illustrated on a specific map display sheet 42. In the past, such written instructions have by necessity been made on separate sheets of paper. This makes it difficult to cross-reference both the written instructions and the information illustrated on the map display sheet 42, particularly while attempting to operate a moving vehicle. Moreover, it is possible to lose the written instructions thus making it more difficult to locate a site on the map display sheet 42. If directions were written on a map directory of prior art design, they were generally written in very narrow margin areas which made it difficult to read. Moreover, once these instructions were written down, that area was no longer available for future instructions relative to a different location on that map display sheet 42. Thus, a key feature of the present invention is the enlarged outer margin portion 48 which is of sufficient size to provided ample writing room to give directions to a specific location on the adjacent map display sheet 48. When that location has been visited and the directions are no longer necessary, the information on the margin portion 48 may be easily removed with the wipe of a cloth, since the laminate surface enables such written instructions to be readily erasable. Thus, the margin portion 48 becomes available for easy reuse as needed for a different location on map display sheet 42 at a different time. Consequently, the width ratio of the margin member 48 relative to the width of the panel 30 is critically important in order to provide sufficient writing room relative to the size of the area outlined in the map display sheet 42.

In addition, since the individual map pages 18 are removable from the directory 10, it is possible that a realtor or other user of the map directory can readily remove a single page as needed with written instructions on that actual page and take only that page in his or her vehicle, thereby avoiding the necessity of carrying the entire directory around for a specific trip. Moreover, as was also previously mentioned, if the information on a specific display sheet 42 becomes obsolete and needs to be changed or updated, the individual sheet 18 of concern can be removed from the directory 10 and then substituted with a new page 18 without having to discard the entire directory 10.

As can be seen from the above, the present invention provides a very useful map directory for realtors, sales people and other individuals requiring a detailed map of a large area which is used while in motion in a moving vehicle. The present invention is soil proof thus can be reused even after being subjected to coffee spills, mud, rain and the like. In particular, the present invention enables a realtor or other users of the map directory to provide written instructions relative to a certain location in the directory and immediately adjacent the map portion pertinent to that location. This provides for easy usage of the map directory and also prevents loss of the written instructions. Moreover, because of the construction of the present invention, this map directory is reusable over and over again since the instructions may be readily wiped from the surface, thus providing a clean margin portion 48 for future use.

The foregoing description and the illustrative embodiments of the present invention have been shown in the drawings and described in detail in varying modifications and alternate embodiments. It should be understood, however, that the foregoing description of the present invention is exemplary only, and that the scope of the present invention is to be limited only to the claims as interpreted in view of the prior art. Moreover, the present invention illustratively disclosed herein, suitably may be practiced in the absence of any element which is not specifically disclosed herein.

I claim:

1. A laminated map panel for use in a map booklet having a key map subdivided into individual map display portions, said panel comprising a substantially flat, relatively stiff panel member including first and second faces located on opposite sides of the plane of said panel member, first and second substantially parallel side edges of generally equal length, and first and second substantially parallel end edges of generally equal length, said panel member including an enlarged map display portion indexed relative to said key map disposed on each of said first and second faces and aligned to provide a blank margin strip member disposed between said map display portion and said first side edge to provide an erasable writing area for directions and information pertinent to the adjacent map display portion, means disposed proximate said second side edge for securing said panel to said booklet, and laminate means covering said first and second faces to provide a dry-erasable surface thereon to enable said written directions and information to be readily removed for reuse of said writing area.

2. The panel as claimed in claim 1, wherein said map booklet includes binder ring members, and wherein said securing means comprises apertures disposed along said second side edge for attachment to said ring members.

3. The panel as claimed in claim 1, wherein said panel member includes cross-reference indicia disposed along one said side edge and one said end edge proximate respective side and end edges of said map display portions.

4. The panel as claimed in claim 1, wherein said panel member further includes a polar directional guide disposed in each said blank margin strip member to provide proper orientation relative to the information contained in said map display portion.

5. The panel as claimed in claim 1, wherein the ratio of the width of each said margin strip member to the width of each said map panel portion is approximately 0.15–0.25, said blank margin strip member extending substantially the entire length of said panel.

6. A map directory comprising:

a binder having a plurality of removable laminated map pages;

means for releasably attaching each said map page to said binder;

a key map positioned toward the front of said binder, said key map being subdivided into individual map display portions; and each said map page comprising a substantially flat, relatively stiff panel including first and second faces located on opposite surfaces of the plane of said panel, first and second side edges defining the longitudinal dimension of said panel, first and second end edges defining the width dimension of said panel, an enlarged map display portion indexed relative to said key map disposed on each of said first and second faces and aligned to provide an enlarged, elongated margin member disposed between said map display portion and said first side edge to provide an area for erasable writing, means disposed along said second side edge for securing said panel to said releasable attachment means, and laminate means covering said first and second faces and including clear laminate sheets to provide a dry-erasable surface.

7. The map directory as claimed in claim 6, wherein said panel side edges are of substantially equal length, and wherein said panel end edges are of substantially equal length.

8. The map directory as claimed in claim 6, wherein said releasable attachment means comprises a ring binder having a plurality of a rings adapted for selective opening and closing, and wherein said page securing means comprises a plurality of apertures disposed along each said second side edge sized, shaped and positioned for insertion within said plurality of rings when said rings are in an open position.

9. The map directory as claimed in claim 8, wherein each said page further includes cross-reference indicia disposed along at least one end edge and one side edge of each said map display portion.

10. The map directory as claimed in claim 9, wherein each said map page further includes a polar directional guide disposed in each said elongated margin member.

11. The map directory as claimed in claim 10, wherein each said elongated margin member is of sufficient size and shape to provide a writing area for directions relative to the adjacent map display portion, said laminate means enabling said writing area to be readily erasable for reuse of said margin writing area.

12. The map directory as claimed in claim 11, wherein each said map display portion includes a cross-reference index associated therewith relative to other map display portions disposed on other pages in said binder.

13. The map directory as claimed in claim 11, wherein the side edges of each said map panel are approximately 8–13 inches in length, wherein the end edges of each said map panel are approximately 5–11 inches in length, and wherein the width of each said elongated margin member of each said panel is approximately 1–2 inches.

14. A book-type map comprising:

a book binder having front and rear covers and a member interconnecting the same;

a plurality of individual map pages pivotally secured to said binder in book fashion;

a key map positioned proximate said front cover and being subdivided into individual map display portions covering a small portion of the geographic area covered by said key map;

each said map page having front and rear faces, first and second side edges defining the longitudinal dimensions of said page with said second side edge being pivotally attached to said binder, first and second end edges defining the width dimension of each said page, and an enlarged map display portion indexed relative to said key map and a margin portion disposed on each said face, each said map display portion being disposed proximate to said end edges and said second side edge, and each said margin portion being disposed proximate said end edges, said first side edge and an adjacent map display portion, each said margin portion being of sufficient width to provide an area for written instructions relating to its adjacent map display portions; and laminate means covering each face of each said page to provide stiffness to said page and an erasable writing surface for each said margin portion to permit reuse of said writing area.

15. The book-type map as claimed in claim 14, wherein each said map page further includes cross-reference indicia across at least one end edge and one side edge of each said map portion, said page side edges being approximately 8–13 inches in length, said page end edges being approximately 5–11 inches in length, and the width of each said margin portion being approximately 1–2 inches.

16. The book-type map as claimed in claim 15, wherein the length of each said page end edge is approximately 8.5 inches, the length of each said page side edge is approximately 11 inches, and the width of each said margin portion is approximately 1.5–2 inches.

* * * * *